United States Patent
Liubinskas et al.

(10) Patent No.: US 8,644,762 B1
(45) Date of Patent: Feb. 4, 2014

(54) MOBILE USER TRACKING AND APPLICATION MONITORING ACROSS AN IUPS INTERFACE

(75) Inventors: Tauras Liubinskas, Wilmore, KY (US); Abhishek Saraswati, Santa Clara, CA (US); Ted Thompson, Boston, MA (US); Sudhir Appana, Santa Clara, CA (US); Antoni Banach, San Jose, CA (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 13/528,636

(22) Filed: Jun. 20, 2012

Related U.S. Application Data

(60) Provisional application No. 61/499,050, filed on Jun. 20, 2011.

(51) Int. Cl.
*H04W 88/02* (2009.01)
(52) U.S. Cl.
USPC .......................................................... 455/41.2

(58) Field of Classification Search
USPC ................. 455/41.2, 404.2, 435.1, 436–444; 370/328, 331, 335
See application file for complete search history.

(56) References Cited

U.S. PATENT DOCUMENTS

| | | | | |
|---|---|---|---|---|
| 2008/0123596 A1* | 5/2008 | Gallagher et al. | ............ | 370/331 |
| 2009/0262683 A1* | 10/2009 | Khetawat et al. | ............ | 370/328 |
| 2009/0262702 A1* | 10/2009 | Khetawat et al. | ............ | 370/331 |
| 2009/0262703 A1* | 10/2009 | Khetawat et al. | ............ | 370/331 |
| 2009/0264095 A1* | 10/2009 | Khetawat et al. | .......... | 455/404.2 |
| 2009/0264126 A1* | 10/2009 | Khetawat et al. | .......... | 455/435.1 |

\* cited by examiner

*Primary Examiner* — Diane Mizrahi
(74) *Attorney, Agent, or Firm* — Fenwick & West LLP

(57) ABSTRACT

A specific user is tracked based on the cell site or service area that the user's device connects to. RANAP, GMM, and SM sessions are associated based on P-TMSI, IMSI, or IMEI. The sessions are maintained based on packets transmitted over the IuPS interface between one or more radio network controllers and a serving GPRS support node. Tracking information associated with information includes usage information such as responsiveness errors, device usage and location. Tracking of a user down to the cell site or service area level assists a mobile service provider in troubleshooting connection issues by providing more complete information and enabling recreation of a user's situation.

20 Claims, 5 Drawing Sheets

MOBILE USER TRACKING AND APPLICATION MONITORING ACROSS AN IUPS INTERFACE

CROSS-REFERENCE TO RELATED APPLICATIONS

This application is related to U.S. Provisional Application No. 61/499,050, filed Jun. 20, 2011, the contents of which is hereby incorporated by reference in its entirety.

FIELD OF THE INVENTION

The invention relates generally to mobile computer network and application monitoring. More specifically, the invention relates to tracking users across an Iu Packet Switched (IuPS) interface.

BACKGROUND OF THE INVENTION

As internet protocol (IP) based networks continue to evolve, an increasing amount of voice and video media traffic is transported. An important functionality of these networks is the transmission of audio and video data using the Real Time Transport (RTP) protocol. RTP is connectionless User Datagram Protocol (UDP) based, and lacks some of the performance management capabilities of connection oriented Transmission Control Protocol (TCP). Without the performance management provided by TCP, UDP traffic is vulnerable to network anomalies making accurate classification and monitoring of RTP difficult.

SUMMARY OF THE INVENTION

Mobile users move around from cell site or service area to cell site or service area, routing area to routing area, location to location and back again. Tracking a specific user within a specific connection session requires correlating user identification information (globally assigned to the user upon purchase of equipment, for example, International Mobile Subscriber Identity (IMSI) or temporarily assigned by the mobile networking equipment) taken from packets as a user moves about.

Tracking user identification information allows monitoring equipment to track users on a IuPS (packet switched interface) as they move from cell site to cell site connecting through different Radio Network Controllers (RNCs) and Serving General Packet Radio Service (GPRS) Support Node (SGSNs). During monitoring, user specific data will be tracked to provide mobile service providers with usage information including responsiveness errors and alarms in a routing area or location area, usage, responsiveness in alarms per cell site, and usage, responsiveness and alarms per user. Additional standard information may be tracked per routing area, cell site or user. In addition, in one embodiment, a mobile service provider or application monitor which cell sites a user's device has connected to and packets transmitted to and from a user's device during a session.

It should be noted that the usage, responsiveness and the errors/alarms can be monitored for IuPS based control messages utilizing Radio Access Network Application Part (RANAP) protocol and GPRS Mobility Management (GMM) as well as application data Hypertext Transfer Protocol (HTTP), Post Office Protocol version 3 (POP3), etc over GPRS Tunneling Protocol U (GTP-U) frames between the RNC and SGSN or RNC and Gateway GPRS Support Node (GGSN) when direct tunneling is involved. In addition, a user device may be tracked without available initial control information.

The disclosed system and method provide a mobile service provider significant insight into activity at a cell level or service area all the way up to the specific network equipment, e.g., SGSN. In addition, because the user is tracked down to the cell level or service area through monitoring an IuPS interface, the mobile service provider can recreate or simulate user sessions to help troubleshoot problems reported by the user as well as understand what the user is experiencing. In addition, a virtual interface may be utilized to provide an interface for a plurality of routing and location areas. This allows a mobile service provider to view statistics, including usage and response times, based on routing area. The service area information can be available in different upstream packets at the RANAP level so that tables can be maintained on a service area basis as well.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A preferred embodiment of the present invention is now described with reference to the figures where like reference numbers indicate identical or functionally similar elements. Also in the figures, the left most digits of each reference number corresponds to the figure in which the reference number is first used.

System Overview

Figure 1:
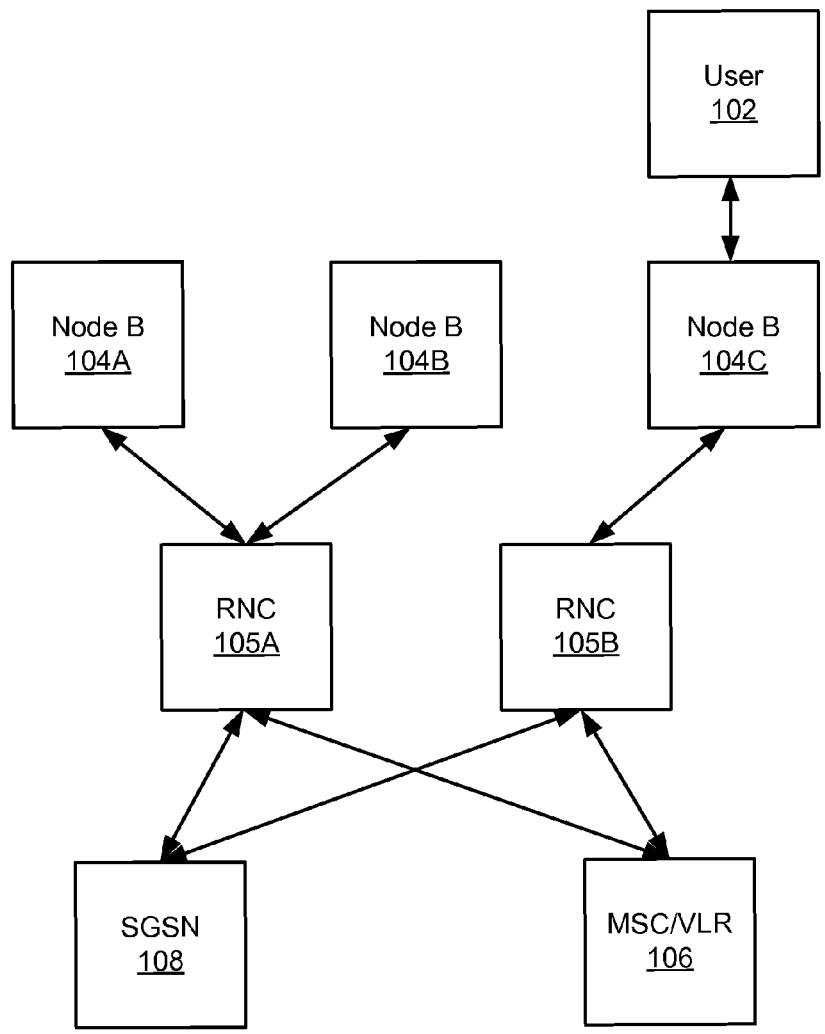
FIG. 1 is an illustration of the location of the IuPS interface in a GPRS network according to one embodiment.

FIG. 1 is an illustration of a system 100 including a user device 102, Node Bs 104, Radio Network Controllers (RNCs) 105, mobile switching center (MSC) and visitor location register (VLR) 106, and serving GPRS support node 108. While an example embodiment is illustrated in FIG. 1, alternate embodiments may feature various numbers of any component in FIG. 1, such as user devices 102, SGSN 108, and Node B 104. Node Bs 104 are hardware that communicate to a user device on a network. A user device 102 may communicate with one or more Node Bs 104 based on availability and location. An RNC 105 is responsible for governing the Node B(s) 104 that are connected to it. The RNC 105 is responsible for resource management and may encrypt data before it is transmitted to and from a user device 102. A SGSN 108 is responsible for the delivery of data to and from RNCs 105. The SGSN 108 is configurable to control tasks including routing and transferring of packets and mobility management. A location register of the SGSN 108 may store location information including the current cell and virtual location register associated with a user device 102, as well as user profiles of all GPRS users registered with the SGSN 108. In one embodiment, the interface between the RNCs 105 and the SGSN 108 is an IuPS interface. In one embodiment, the RNCs 105 are also configured to communicate with the MSC and VLR 106. The MSC is configurable to route voice calls, SMS and other services while the VLR stores information on subscribers or users who communicate through the MSC which the VLR servers. Stored subscriber information may include an associated international mobile subscriber identity (IMSI), authentication data, and services that the subscriber is permitted to access. The MSC/VLR 106 and the SGSN 108 are further configurable to connect to broader external networks which may include a public switched telephone network (PSTN), integrated services digital network (ISDN), and internet or intranet network.

Figure 2:
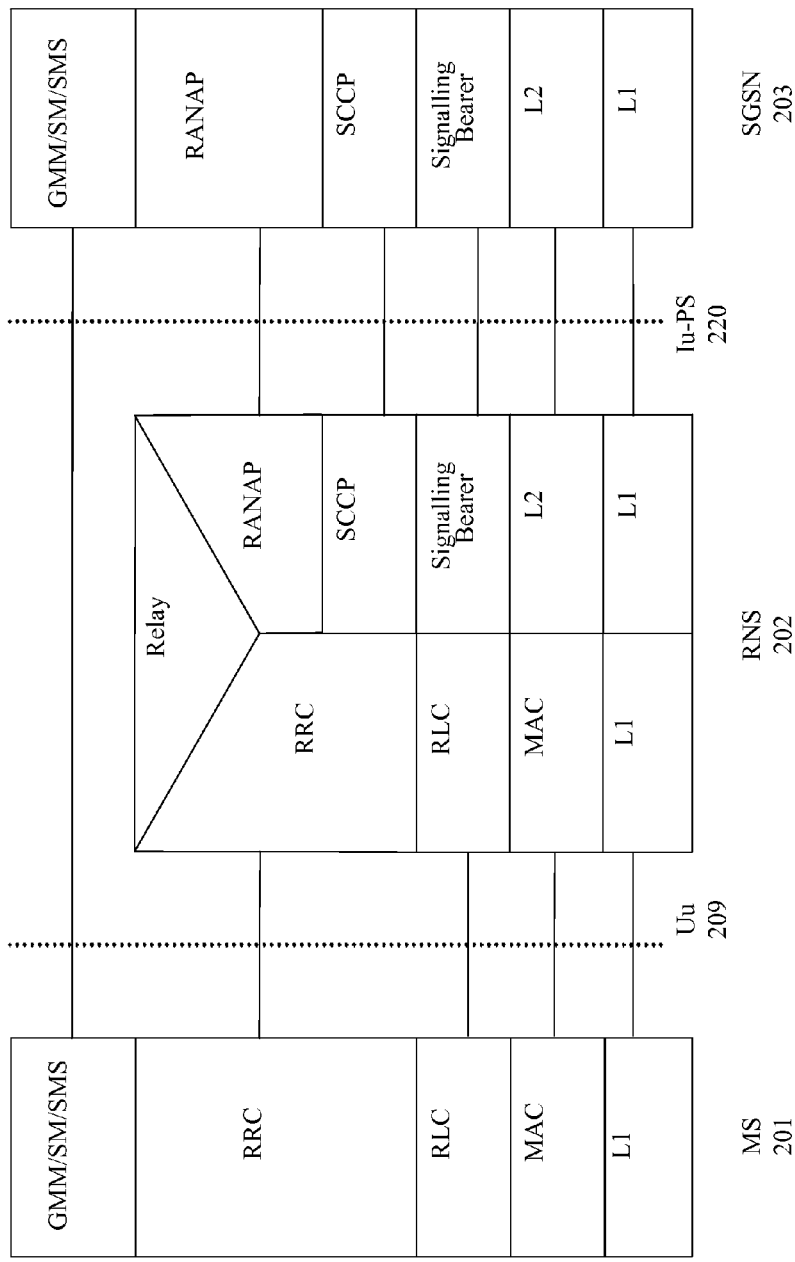
FIG. 2 is an illustration of a general protocol stack used to establish and maintain IuPS sessions according to one embodiment.

FIG. 2 is an illustration of a general protocol stack used to establish and maintain IuPS sessions according to one embodiment. A signaling connection control part (SCCP) runs over stream control transmission protocol (SCTP) and provides the basic connection between an RNC 105 and SGSN 108. It will transport all other messages associated with a given GPRS mobility management (GMM) session between the specific RNC 105 and SGSN 108. When there is a switch to a different RNC/SGSN pair there will be a new SCCP connection for the given GMM session. Note that the SCTP will allow multiple SCCP/RANAP to be taken from a single packet. This allows a single packet to involve different users as well as different user sessions.

Radio access network application part (RANAP) protocol is utilized to communicate over SCCP. RANAP provides the following pieces of information: routing information along with service area information, radio access bearer (RAB) ID to correlate GTP tunnel endpoint identifier (TEID) and transport IP address information with network service access point identifier (NSAPI) and IMSI during RNC transfer. GMM provides end to end mobile session initiation with an attach message to the network. It rides on top of RANAP's direct transfer message, InitialUE and SCCP, but is associated with a different SCCP/RANAP session when a RNC transfer occurs. The GMM session will be maintained across different SCCP/RANAP sessions. A GMM session is the anchor for a user which the SCCP/RANAP and SM sessions will be associated with.

Session management (SM) provides the creation of packet data protocol (PDP) context for an active session. It rides on top of RANAP's direct transfer message and SCCP, but will have a different SCCP/RANAP session when a RNC transfer occurs. The SM session will be maintained across different SCCP/RANAP sessions based on the different assignments which may include outer IP Address and TEID pairs for GTP-U traffic. GTP-U tunneled data will be carried between the RNC and the SGSN or, in some cases, a Gateway GPRS Support Node (GGSN). The GTP-U packets contain an outer tunnel Internet Protocol (IP) address which will be sent between the RNC and SGSN or RNC and the GGSN. In addition, the GTP header contains a GTP TEID which will be associated with an end user data session created by the SM. The RANAP layer will assign the outer IP Addresses as well as the TEIDs. These IP addresses and TEIDs can change during an SM session during various handover events, but, in one embodiment, the end user IP Address which is in the inner tunnel IP header will be maintained. The end user IP address is assigned during the SM session creation and is tracked.

Figure 3:
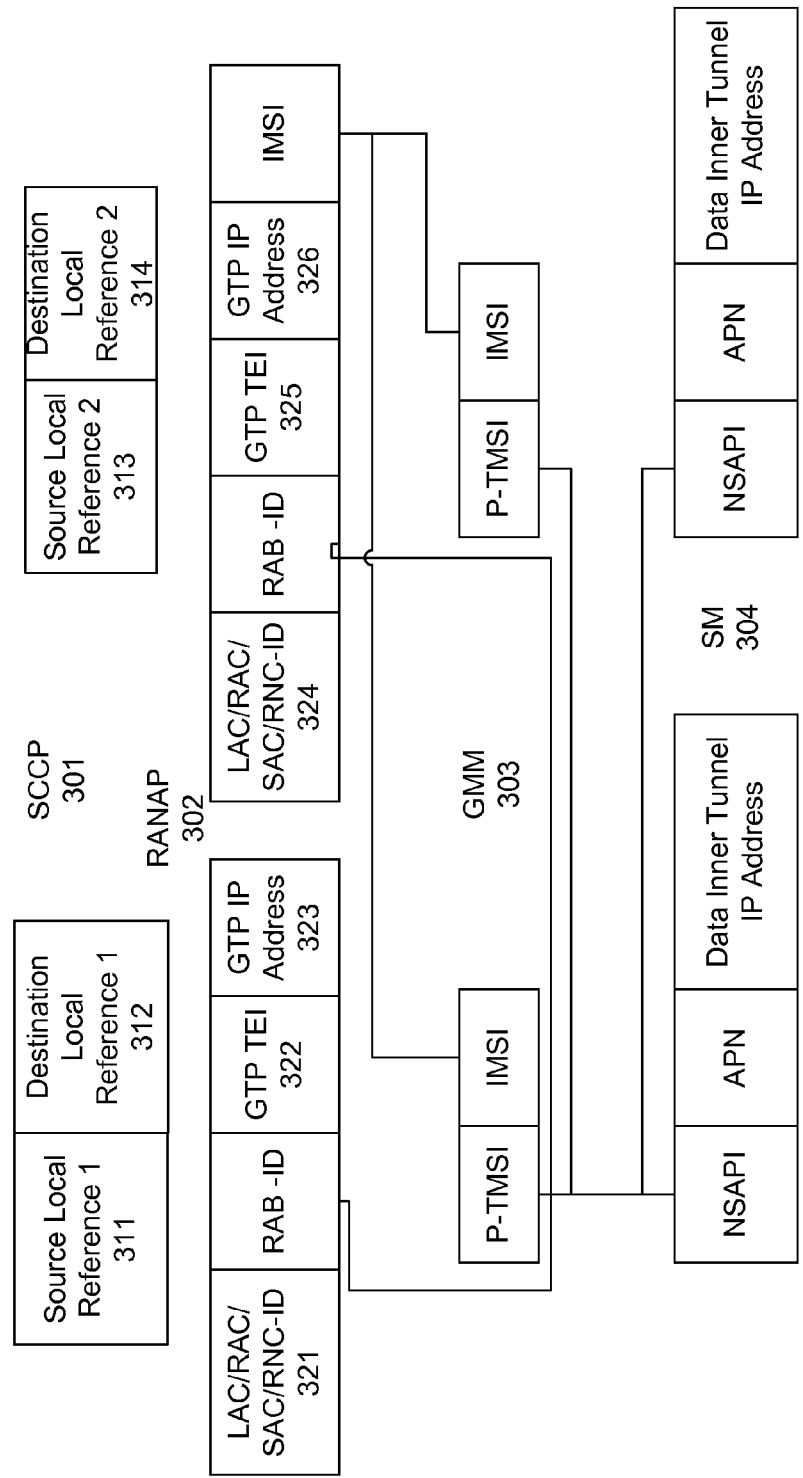
FIG. 3 is an illustration of session tables maintained according to one embodiment.

FIG. 3 is an illustration of session tables maintained according to one embodiment. Two sets of session tables are illustrated to allow indication of how a switch procedure occurs, which is described below. The first session table is SCCP 301 RANAP 302 table which is used to maintain SCCP RANAP sessions which carry GMM SM messages as well as GTP-U tunnel information when user data sessions are established. GTP Tunnels will carry the end user data. SCCP/RANAP connections are established when the user enters into the network to establish an initial session on the network, when the user requests to send data and under various handover scenarios. During the initial setup of the RANAP connections, the IMSI can be sent in certain commands or messages. The IMSI will be passed from the RANAP session code to the GMM session code to assist in correlation with existing GMM sessions.

The second session table is a GMM table 303 which maintains user specific information when the user attaches to the network. Once the user is attached, the user is associated with a packet temporary mobile subscriber identity (P-TMSI), IMSI or international mobile equipment identity (IMEI) which is maintained during the session. The P-TMSI can be changed within the session with various GMM messages. In one embodiment, if a new SCCP/RANAP connection is established in which there will be GMM message or SM message exchanged, the first message that is sent contains the current P-TMSI. The P-TMSI is used to find the current session and associated information. In one embodiment, if a RANAP connection is created in which there is no GMM/SM message exchanged, but GTP connection information is sent due to a handover, the IMSI that is sent over the GTP connection is used to correlate to a GMM message. If a P-TMSI does not match any session, a new GMM session may be created. The row associated with a session can be hashed using the P-TMSI, IMEI or IMSI when one of the identifiers is available. It should be noted that, in one embodiment, a SCCP/RANAP session is associated with a single GMM session, while a single GMM session can be associated with many SCCP/RANAP and SM sessions.

The third session table is a SM table 304 which contains SM messages when a user activates a packet data protocol (PDP) context. In one embodiment, the SM is maintained until an activated context is deactivated or the GMM session is deleted or expired. There can be multiple SM sessions for a given GMM session. The SM sessions are differentiated by a network service access point identifier (NSAPI) and maintained across messages via transaction IDs (TIs). In addition, certain RANAP messages (RAB based) may have GTP-U information for a given NSAPI (RAB ID within the RANAP message). This can be used to create an SM session if a given SM session for a GMM session has not been created. In one embodiment, end user information is tracked when an SM message containing the end user IP address is not received. The end user IP address can be determined by parsing the GTP tunnel inner IP header contained in the GTP information retrievable from RANAP messages.

An SCCP/RANAP session is created with both the local references known from the SCCP connection request and connection confirm messages. RANAP initial UE message(s) are sent with a GMM attach request. In one embodiment, the RANAP creates an XDR row and will create a virtual ID using the LA/RA/SA. The GMM parser creates a GMM session based on at least the P-TMSI. The GMM parser also creates an XDR row. The parser adds the specific GMM session row information (actual address of the row location) to the SCCP/RANAP session structure. If an identity request is made, the IMSI/IMEI can be retrieved from the packet. This can also be performed for the authentication sequence.

In one embodiment, an SM session is created from an activate PDP context request. The access point name (APN) and NSAPI can be retrieved from the context request. With the response activate PDP context accept, the data IP address can be retrieved which is used in the GTP tunnel. An SM Session can also be created by using the RANAP based RAB assignment commands discussed below. In one embodiment, during the SM session create process the RANAP layer is assigned the TEID and tunnel IP address for the GTP sessions using the RAB assignment and the NSAPI is mapped. The SM session can then be tied to the GTP-U according to the TEIDs of each, and the relationship can be used to maintain the SM, GMM and RANAP sessions. The GTP-U data may have the VID (routing information) associated with the SM session. In one embodiment, if a SCCP session has ceased due to inactivity, a row may be newly created or correlated when a user continues to the SCCP session. After creation of the new SCCP connection, a GMM service request is sent with a P-TMSI. This allows the corresponding GMM row to be located.

In a switch procedure certain fields may be altered. This also is relevant when different RANAP/SCCP sessions activate and deactivate during a GMM session. The source local reference 1 311, destination local reference 1 312, LAC/RAC/SAC/RNC-ID 321, GTP TEI 322, and GTP IP address 323 are associated with a first SCCP/RANAP connection in which GMM and SM sessions are created. The source local reference 2 313, destination local reference 2 314, LAC/RAC/SAC/RNC-ID 324, GTP TEI 325, and GTP IP address 326 are associated with a new SCCP/RANAP session which is created between a new RNC and SGSN or any other new SCCP/RANAP session. The IMSI, IMEI, and P-TSMI fields are utilized to associate the new SCCP/RANAP session including Source Local Reference 2 313 with the GMM session. In one embodiment, an IMSI may be found in a RANAP RelocationResourceAllocation message as the PermanentNAS-UE-ID. Various GMM messages may also be sent containing the P-TMSI, IMSI, or IMEI.

In one embodiment, a message containing an identifying field is not received until after one or messages have been received that do not contain an identifying field, e.g., an authentication request. In this situation, a new XDR ID may be allocated and later associated with a previously existing XDR ID when a message containing an identifying field is received, enabling identification of the previously existing XDR ID. With two GMM XDR IDs existing for the same GMM session, relevant information may be copied from the old GMM session to the new session and the new XDR ID can be updated. In one embodiment, SM sessions associated with the old GM session may still be relevant. To account for this, new SMS sessions are created with the old SM session information, and the new SMS sessions are associated with the new GMM session. Alternatively, to link previous GMM/SM sessions to a new SCCP/RANAP session, GTP-U packets may be utilized. A GTP-U packet contains an inner tunnel IP address that is unique and is received with a new GTP TEI and GTP address. The inner tunnel IP address can then be matched to the inner tunnel IP address associated with the SM session. The GTP TEI and RANAP GTP TEI can be compared and a match identified.

The following table contains the fields used to maintain an SCCP session that carries the RANAP and any GMM and SM messages. In one embodiment, only the connection request and connection confirm messages will be parsed. Other messages will be classified as RANAP and no further RANAP processing will occur.

| Message | Field1 | Field2 |
| --- | --- | --- |
| Connection Request | Source Local Ref | |
| Connection Confirm | Source Local Ref | Destination Local Ref |

The following table contains the fields that may be extracted from various RANAP messages:

| Message | Field1 | Field2 | Field3 | Field4 |
| --- | --- | --- | --- | --- |
| InitialUE-Message | LAC-RAC-SI | Global RNC Id | | |
| Direct Transfer | LAC-RAC-SI | | | |
| Common ID | IMSI | | | |
| RAB Assignment | RAB Ids | Data Plane IPs | Data Plane TEIDs | |
| RAB Assignment Response | RAB Ids | Data Plane IPs | Data Plane TEIDs | |
| Relocation Preparation | Source RNC Id | Target RNC Id | | |
| Relocation Resource Allocation-Relocation Request | IMSI | RAB Ids | Data Plane IPs | Data Plane TEIDs |
| Relocation Resource Allocation-Relocation Request Ack | RAB Ids | Data Plane IPs | Data Plane TEIDs | |
| Iu-Release Command | | | | |
| Iu-Release Complete | | | | |

In one embodiment, a SCCP/RANAP session begins with reception of the SCCPs connection request message. The connection request message may contain a RANAP message. In one embodiment, the SCCP connection does not continue unless it receives the connection confirm message. The connection confirm message contains both reference numbers that are used to make sure that the requests are associated with the correct responses. When a SCCP session is then created, an RANAP XDR session can be created with the first RANAP message. In one embodiment, there is a single SCCP/RANAP session and only the RANAP session will be tracked by XDR ID.

Figure 4:
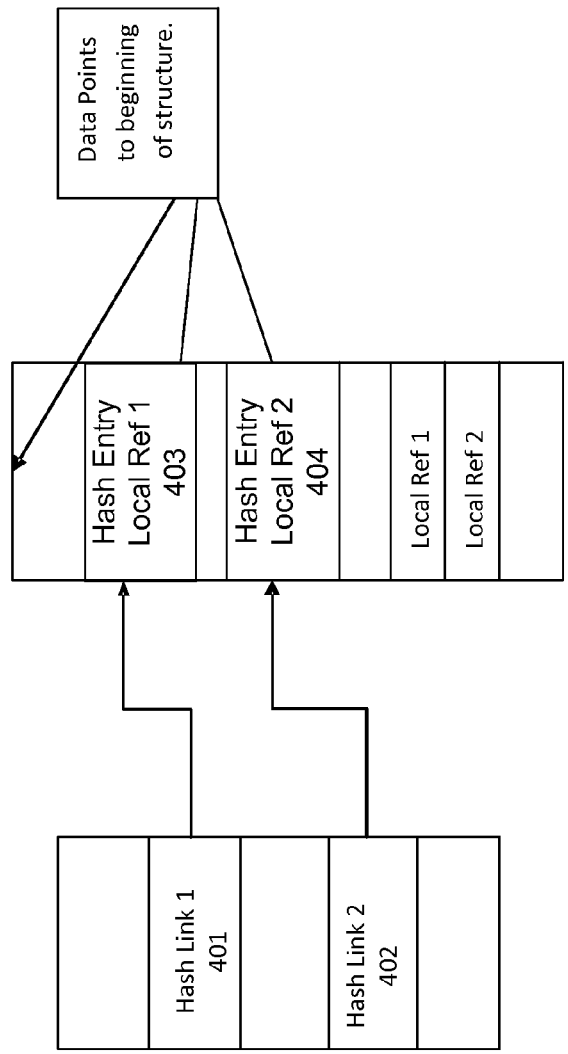
FIG. 4 is an illustration of a system for storing reference numbers in the session structure according to one embodiment.

FIG. 4 is an illustration of a system for storing reference numbers in the session structure according to one embodiment. Local reference hash entries 403 and 404 may be accessed via a hash table. The storage system allows table entries to be in the same hash table, but associated with different hash links 401 and 402. The table entry can then be used for multiple references numbers without having to allocate and manage additional sets of memory. In one embodiment, three hash tables are maintained pointing to a single GMM row containing P-TMSI, IMSI and IMEI.

Session Management

Generation of a new XDR session row occurs as follows according to one embodiment: when a first GMM message is received on a RANAP session, a GMM session/XDR is created if the associated PTMSI, IMSI, or IMEI does not match those of any current sessions. It should be noted that there is a one to one relationship between a RANAP session and a GMM session. Once a session is established as a RANAP session, GMM and SM messages on the RANAP session will also be part of the associated GMM session. The first GMM message on a new RANAP session may not have a PTMSI, IMSEI, or IMEI to match with an existing session. It may then be useful o match an existing XDR with an older XDR once we have a P-TMSI, IMSI, or IMEI. When a P-TMSI, IMSI, or IMEI in a new row matches that of an old row, the old row is aged out and the new row is updated with information from the old row. This information may include SM sessions, IMEI, P-TMSI, or IMSI. In one embodiment, the old XDR ID and its start time is saved in the new XDR to better enable tracking of XDRs.

In one embodiment, reception of an attach request messages always results in creation of a new session without attempting to find a match in a previously created session. An SM message may also result in generation of a new GMM session. The end user IP address stored in the XDR can be used to identify a user on the GM interface. The GMM session may not have any identifiable keys or IDs until a message containing an IMSI, PTMSI, or IMEI is received. Upon reception of an IMSI, PTMSI, or IMEI the system may attempt to match them with fields of previously generated GMM sessions.

Ageout of a session may occur when no GMM message, SM message, RANAP message, or GTP-U data is received for any of the SM sessions associated with the GMM session for a designated ageout period or time length. In one embodiment, a GMM ageout also result in ageout of any SM sessions or RANAP sessions associated with the aged out GMM session. Aging out of a session result in deletion of the XDR or session.

When a new SCCP/RANAP session is going to be created, matching to previously generated sessions is attempted based on PTMSI, IMSI, or IMEI. An old SCCP/RANAP session may still be valid which results in awaiting other messages or a RANAP release. A pointer for a SCCP/RANAP is maintained to the associated GM session so that other messages during the current SCCP/RANAP session are associated with the associated GMM session. The following table details potential GMM messages that can be received and the data extracted from each according to one embodiment.

| Message | Field1 | Field2 |
|---|---|---|
| ATTACH_REQUEST | Initial P-TMSI | |
| ATTACH_ACCEPT | New P-TMSI | |
| ATTACH_COMPLETE | — | |
| ATTACH_REJECT | GMM Cause | |
| DETACH_REQUEST | P-TMSI | Power Down Indicator |
| DETACH_ACCEPT | — | |
| RAU_REQUEST | P-TMSI | |
| RAU_ACCEPT | P-TMSI | |
| RAU_COMPLETE | — | |
| RAU_REJECT | GMM Cause | |
| PTMSI_REALLOC_CMD | P-TMSI | |
| PTMSI_REALLOC_COMPLETE | | |
| AUTH_CIPH_REQUEST | — | |
| AUTH_CIPH_RESPONSE | IMEI | |
| AUTH_CIPH_REJECT | GMM Cause | |
| ID_REQUEST | — | |
| ID_RESPONSE | IMSI | IMEI |
| AUTH_CIPH_FAILURE | GMM Cause | |
| SERVICE_REQUEST | P-TMSI | |
| SERVICE_RESPONSE | — | |
| SERVICE_REJECT | GMM Cause | |

SM sessions are associated with a user data session and have an end user IP address associated with each SM session. An SM session also has a GTP-U IP address and TEID for both upstream and downstream communication. The GTP-U IP address and TEID are stored using a hash table. These are used to correlate GTP-U packets with SM sessions and GMM sessions. SM sessions are generated when an SM message or RAB message is received containing GTP-U data. SM sessions may be deleted upon receiving commands such as an activate PDP reject, modify PDP reject, and deactivate PDP accept. An SM session is also deleted when the associated GMM session is deleted. Similarly, an SM session is aged-out and deleted if the associated GMM session ages-out and is deleted.

In one embodiment, a GMM session may age-out because a new RANAP connection did not have the IDs to associate with a previous GMM session that has approached and gone beyond the age timeout period without an associated message being received. The associated SM session may also age-out as previously described. If a packet is received containing an ID allowing the RANAP connection to be associated with an aged-out GMM session, a new SM session is created using the information from the old SM session. The new SM sessions parent GMM will become a new GMM XDR ID. The following table details potential SM messages that can be received and the data extracted from each according to one embodiment.

| Message | Field1 | Field2 | Field3 | Field4 |
|---|---|---|---|---|
| ACT_PDP_REQUEST | TI | NSAPI | APN | |
| ACT_PDP_ACCEPT | TI | User IP Address | | |
| ACT_PDP_REJECT | TI | Cause | | |
| DEACT_PDP_REQUEST | TI | | | |
| DEACT_PDP_ACCEPT | TI | | | |
| MOD_PDP_REQUEST (Both Directions) | TI | Linked TI | NSAPI | User IP Address |
| MOD_PDP_ACCEPT (Both Directions) | TI | | | |
| MOD_PDP_REJECT (Both Directions) | TI | Cause | | |

In one embodiment, rows of GMM, SM and SCCP/RANAP sessions are kept alive (moved to the end of an ageout list) whenever GTP-u data is received associated with the given table row.

As GMM sessions track the current location of the user (VID and Service Area Id) and specific SM and GTP-U data sessions are linked to the specific GMM sessions, the SM control data and the GTP-U end user data can be tracked down to the service area level. Whenever a GMM, SM or GTP-U packet is received the VID is retrieved as well as the service area from the associated GMM row. The specific packet can then be associated with the VID and service area in both the CDM/QOE data structures and XDR data structures. In one embodiment, the connection ID changes when a transition is made in any data field, La/RA or service area ID. This allows a user to be tracked as they move and connected to the network through various node Bs. Detailed statistics may also be kept for specific service areas for a specific user or for users in general. Since IuPS messages utilize SCTP as a transport layer, the described tracking system allows many GMM, SCCP/RANAP and SM session to be associated with a single packet. Many XDR IDs may then be stored per packet allowing tracking and updating of many CDM/QOE and XDR row information per packet received.

Figure 5:
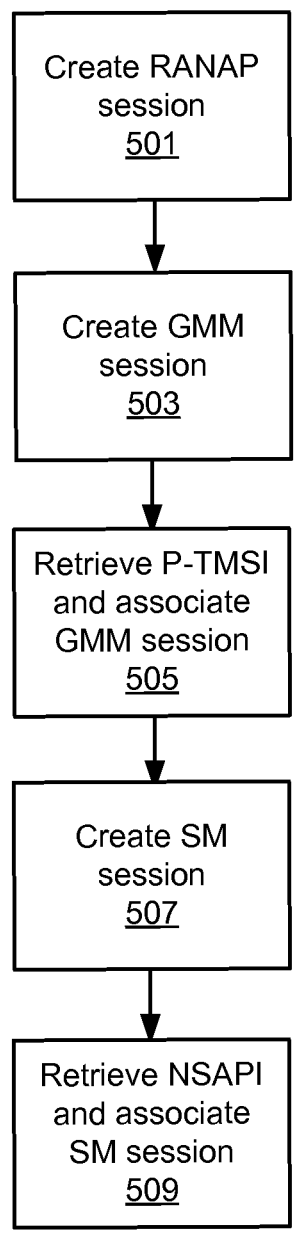
FIG. 5 is an illustration of a flow chart for creating and associating RANAP, GMM, and SM sessions according to one embodiment.

FIG. 5 is an illustration of a flow chart for creating and associating RANAP, GMM, and SM sessions according to one embodiment. A RANAP session is created 501 based on data parsed from SCCP connection request and connection confirm messages. Upon reception of a GMM ATTACH request, a GMM session is created 503. The GMM session includes GMM data parsed and retrieved 505 from the GMM attach request including the P-TMSI. The GMM session is associated with the RANAP session. In one embodiment, the address of the GMM row location is stored in the RANAP session structure. An SM session is created 507 upon receiving an activate PDP context request. In one embodiment, each SM session is associated with an NSAPI retrieved 509 from the PDP context request. The SM session is associated 509 with the RANAP session based on the NSAPI. In one embodiment, an SM session may also be generated by parsing user identifying information from RAB assignment commands.

IuPS tracking allows a mobile service provider to see a wide range of activity on an IuPS interface. An IuPS session in midstream (no GMM control messages) can also be analyzed and still provide useful information about the IuPS interface as well as a specific user related to packets transmitted over the IuPS interface. Other applications and systems, e.g., NGENIUS PERFORMANCE MANAGER AND NGENIUS SUBSCRIBER INTELLIGENCE by NETSCOUT SYSTEMS, INC. of Westford, Mass., may be enabled to analyze the IuPS tracking data and enhance end user visibility in the IuPS interface. Users may also be monitored down to the service area level allowing mobile service providers to track user mobility and retrieve actual packets transmitted during a user session. Troubleshooting connection issues may be simplified with such information.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the present invention is not described with reference to any particular programming language. It will be appreciated that a variety of programming languages may be used to implement the teachings of the present invention as described herein, and any references herein to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

What is claimed is:

1. A method for mobile user monitoring, the method comprising:
   receiving a command for initialization of a radio access network application part (RANAP) session over an interface with a packet switched network ("IuPS interface"), the command for initialization containing user identifying information;
   storing RANAP data associated with the RANAP session in a non-transitory computer readable storage medium;
   associating a general packet radio service mobility management (GMM) session with the RANAP session based on the user identifying information and storing GMM data associated with the GMM session;
   associating a session management (SM) session with the RANAP session based on the user identifying information and storing SM data associated with the SM session; and
   determining user specific data based on the stored RANAP data, GMM data, and SM data.

2. The method of claim 1, wherein the IuPS interface is a connection between a radio network controller and a serving general packet radio service support node.

3. The method of claim 1, wherein the user identifying information is one of an international mobile subscriber identity, international mobile equipment identity, or packet temporary mobile subscriber identity.

4. The method of claim 1, further comprising:
   associating the GMM session with a second RANAP session based on the user identifying information.

5. The method of claim 1 further comprising:
   associating the SM session with a second RANAP session based on the user identifying information.

6. The method of claim 1, wherein the determined user specific data comprises the identities of cell sites the user communicated with during the RANAP session.

7. The method of claim 1 further comprising:
   associating the GMM session with a second SM session, the second SM session differentiated from the SM session according to a network service access point identifier.

8. A computer program product for mobile user monitoring, the computer program product comprising a non-transitory computer-readable storage medium storing instructions that when executed cause at least one processor to:
   receive a command for initialization of a radio access network application part (RANAP) session over an interface with a packet switched network ("IuPS interface"), the command for initialization containing user identifying information;
   store RANAP data associated with the RANAP session;
   associate a general packet radio service (GPRS) mobility management (GMM) session with the RANAP session based on the user identifying information and storing GMM data associated with the GMM session;
   associate a session management (SM) session with the RANAP session based on the user identifying information and storing SM data associated with the SM session; and
   determine user specific data based on the stored RANAP data, GMM data, and SM data.

9. The computer program product of claim 8, wherein the IuPS interface is a connection between a radio network controller and a serving general packet radio service support node.

10. The computer program product of claim 8, wherein the user identifying information is one of an international mobile subscriber identity, international mobile equipment identity, or packet temporary mobile subscriber identity.

11. The computer program product of claim 8, further comprising instructions to:
    associate the GMM session with a second RANAP session based on the user identifying information.

12. The computer program product of claim 8 further comprising instructions to:
    associate the SM session with a second RANAP session based on the user identifying information.

13. The computer program product of claim 8, wherein the determined user specific data comprises the identities of cell sites the user communicated with during the RANAP session.

14. The computer program product of claim 8, further comprising instructions to:
    associate the GMM session with a second SM session, the second SM session differentiated from the SM session according to a network service access point identifier.

15. A system for mobile user monitoring, the system comprising:
    a computer-readable storage medium storing executable computer program instructions comprising instructions for, which when executed by a computer processor comprises:
    receiving a command for initialization of a radio access network application part (RANAP) session over an interface with a packet switched network ("IuPS interface"), the command for initialization containing user identifying information;
    storing RANAP data associated with the RANAP session;
    associating a general packet radio service mobility management (GMM) session with the RANAP session based on the user identifying information and storing GMM data associated with the GMM session;
    associating a session management (SM) session with the RANAP session based on the user identifying information and storing SM data associated with the SM session; and
    determining user specific data based on the stored RANAP data, GMM data, and SM data; and
    a processor for executing the computer program instructions.

16. The system of claim 15, wherein the Iups interface is a connection between a radio network controller and a serving general packet radio service support node.

17. The system of claim 15, wherein the user identifying information is one of an international mobile subscriber identity, international mobile equipment identity, or packet temporary mobile subscriber identity.

18. The system of claim 15, further comprising instructions for:
    associating the GMM session with a second RANAP session based on the user identifying information.

19. The system of claim 15 further comprising instructions for:

associating the SM session with a second RANAP session based on the user identifying information.

20. The system of claim 15 further comprising instructions for:

associating the GMM session with a second SM session, the second SM session differentiated from the SM session according to a network service access point identifier.

* * * * *